United States Patent [19]

Brown

[11] Patent Number: 5,477,539
[45] Date of Patent: Dec. 19, 1995

[54] NARROW BAND SIMULCAST SYSTEM HAVING LOW SPEED DATA DISTRIBUTION

[75] Inventor: Thomas A. Brown, Lynchburg, Va.

[73] Assignee: Ericsson Inc., Research Triangle Park, N.C.

[21] Appl. No.: 95,858

[22] Filed: Jul. 23, 1993

[51] Int. Cl.$^6$ .............................. H04B 1/00; H04B 5/04; H04J 4/00
[52] U.S. Cl. ....................... 370/84; 370/95.2; 455/51.2; 455/57.1
[58] Field of Search ................. 370/84, 32, 47, 370/95.2, 95.3, 100.1; 455/33.1, 56.1, 57.1, 51.1, 51.2

[56] References Cited

U.S. PATENT DOCUMENTS

| | | | |
|---|---|---|---|
| 3,902,161 | 8/1975 | Kiowski et al. | 340/147 |
| 4,218,654 | 8/1980 | Ogawa et al. | 370/97 |
| 4,255,814 | 3/1981 | Osborn | 455/51 |
| 4,317,220 | 2/1982 | Martin | 455/58 |
| 4,411,007 | 10/1983 | Rodman et al. | 375/107 |
| 4,414,661 | 11/1983 | Karlstrom | 370/95 |
| 4,472,802 | 9/1984 | Pin et al. | 370/104 |
| 4,475,246 | 10/1984 | Batlivala et al. | 455/18 |
| 4,516,269 | 5/1985 | Krinock | 455/51 |
| 4,570,265 | 2/1986 | Thro | 455/52 |
| 4,578,815 | 3/1986 | Persinotti | 455/15 |
| 4,597,105 | 6/1986 | Freeburg | 455/33 |
| 4,608,699 | 8/1986 | Batlivala et al. | 375/5 |
| 4,696,051 | 9/1987 | Breeden | 455/33 |
| 4,696,052 | 9/1987 | Breeden | 455/51 |
| 4,718,109 | 1/1988 | Breeden et al. | 455/51.2 |
| 4,835,731 | 5/1989 | Nazarenko et al. | 379/63 |
| 4,903,262 | 2/1990 | Dissosway et al. | 370/95.2 |
| 4,903,321 | 2/1990 | Hall et al. | 455/34 |
| 4,905,302 | 2/1990 | Childress et al. | 455/34 |
| 4,918,437 | 4/1990 | Jasinski et al. | 340/825.44 |
| 4,926,496 | 5/1990 | Cole et al. | 455/77 |
| 4,939,746 | 7/1990 | Childress | 455/33 |
| 4,968,966 | 11/1990 | Jasinski et al. | 340/825.44 |
| 5,003,617 | 3/1991 | Epsom et al. | 455/51 |
| 5,014,344 | 5/1991 | Goldberg | 455/51 |
| 5,046,128 | 9/1991 | Bennett | 455/51 |
| 5,105,439 | 4/1992 | Bennett et al. | 375/10 |
| 5,127,101 | 6/1992 | Rose, Jr. | 455/51.1 |
| 5,128,934 | 7/1992 | Jasinski | 370/84 |
| 5,172,396 | 12/1992 | Rose, Jr. et al. | 375/107 |
| 5,253,253 | 10/1993 | Brame et al. | 370/85.11 |

FOREIGN PATENT DOCUMENTS

61-107826  5/1986  Japan.
0246619  11/1987  Japan.

Primary Examiner—Douglas W. Olms
Assistant Examiner—Ricky Q. Ngo
Attorney, Agent, or Firm—Nixon & Vanderhye

[57] ABSTRACT

A "narrow band" public service trunking (PST) simulcast radio frequency transmission system having high-speed and low-speed digital data access capabilities in addition to analog voice operates in the 900 MHz frequency-range, as distinguished from a conventional "wide band" PST system that operates in the 800 MHz frequency range. In a narrow band PST simulcast system having digital access capabilities, the handling of low speed digital data must be accomplished differently than high speed data since it becomes unique to each channel. This would ordinarily require providing an additional data path for each channel, or a wider band width audio path neither of which is feasible or cost effective. Arrangements are therefore provided for the routing of low-speed data to each transmit site via the high-speed digital data channel path for each site and for holding the high-speed data resynchronization circuitry at each site at its previous latency during the transmission of low-speed data, which would otherwise cause erroneous triggering of the resynchronization circuitry.

2 Claims, 4 Drawing Sheets

NARROW BAND SIMULCAST SYSTEM HAVING LOW SPEED DATA DISTRIBUTION

CROSS-REFERENCES TO RELATED APPLICATIONS AND PATENTS

This application is somewhat related to copending commonly-assigned application Ser. No. 07/824,123 of Brown et al filed 22 Jan. 1992 entitled "Self Correction of PST Simulcast System Timing". This application is also somewhat related to commonly-assigned U.S. Pat. Nos. 4,903,321 to Hall et al, issued Feb. 20, 1990; No. 4,905,302 to Childress et al., issued Feb. 27, 1990; No. 4,905,234 to Childress et al., issued Feb. 27, 1990; No. 5,172,396 to Rose et al, issued Dec. 15, 1992 and No. 4,939,746 to Childress, issued Jul. 3, 1990. The disclosures of each of the above applications and patents are incorporated by reference as if expressly set forth herein.

FIELD OF THE INVENTION

This invention relates to radio frequency (RF) signal transmission systems, and in particular to "simulcasting" systems for providing the simultaneous transmission of the same information by two or more separately located RF transmitters. More particularly, the invention relates to the operation of a "narrow band" (900 MHz) digital access trunked communication simulcast system, and still more particularly to an improved method and apparatus for distributing low speed data to transmitting sites in a narrow band PST simulcast system.

BACKGROUND AND SUMMARY OF THE INVENTION

Radio repeater trunking (i.e., time sharing of a single repeater communications channel among many users) is well known. Although there are many actual potential applications for trunked radio repeater systems, one of the more important applications is for public service trunked (PST) systems. Various known prior trunked communication system of this sort offer the capability of handling high speed digital data communications (e.g., digitally encrypted voice) in addition to conventional analog voice communications and, thus, provide users with selectable digital access to the trunked system. An exemplary digital access PST system is discussed in,commonly-assigned U.S. Pat. No. 4,905,302 to Childress et al entitled "Trunked Radio Repeater System," which is incorporated by reference herein.

Figure 1:
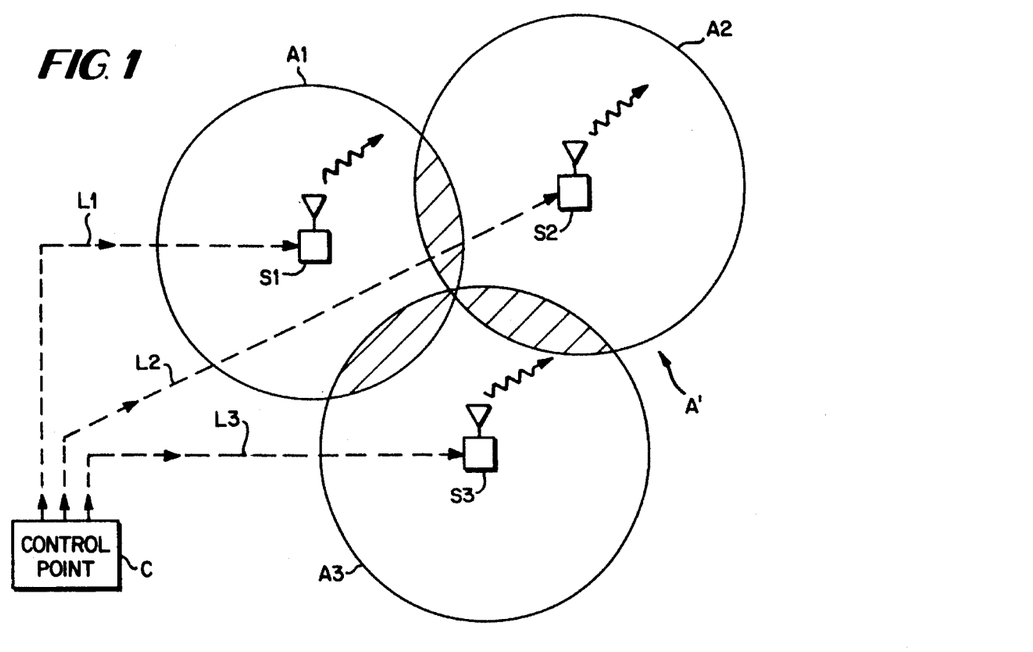
FIG. 1 is a schematic diagram of a presently preferred exemplary simplified multisite RF communication simulcast system of a type on which operation of the present invention may be particularly suited.

As is well known, it may not be possible for a single RF repeater transmitting site to satisfactorily serve a geographically large coverage area. Accordingly, systems which must provide RF communications for an entire large geographical area (e.g. , a major metropolitan area, a large county, etc.) typically include multiple RF transmissions sites. FIG. 1 is a schematic diagram of a simplified multiple-site "simulcast" system having three radio repeater (transmitting) sites S1, S2 and S3 for providing simulcast communications to geographical coverage areas A1, A2 and A3, respectively. A control point or "hub" C (e.g., a dispatch center) provides identical signals to each of sites S1 through S3 via links L1 through L3, respectively. These links are typically microwave inks. Each site S1–S3 transmits the signals it receives from the control point C to its respective coverage area A, so that a mobile or portable transceiver receives the same signal no matter where it happens to be in the communications system overall coverage area A (which constitutes the "union", in an analogy to Venn diagrams of the individual coverage areas A1, A2 and A3).

Mobile or portable transceivers within area A1 can receive the signals transmitted by site S1, transceivers within area A2 can receive the signals transmitted by site S2, and transceivers within area A3 can receive signals by site S3. Transceivers moving out of a first site coverage area and into a second sites area cease monitoring the signals transmitted by the first site and begin monitoring the signals transmitted by the second site such that communication is continuously maintained without interruption so long as the transceiver stays within the overall combined system coverage area A'. In order to insure the RF transmission from these multiple sites do not interfere with each other in overlapped regions, it is necessary to: a) operate the sites on different frequencies, or b) operate the sites on the same frequency and time share their operation, or c) employ coherent simulcast techniques. In a coherent simulcast system, the various transmitting sites transmit substantially the same signals substantially simultaneously at substantially the same radio frequency to avoid adverse interference effects at the mobile transceiver when in the overlap areas.

More specifically, simulcast involves transmitting "coherent" modulation over several transmitters operating on the same assigned RF channel but located at different sites. This means that the modulated RF signals from two simulcast sites would have to arrive at a receiver in the overlap coverage area at precisely the same time. The receiver would then see no difference between the signals received from the two simulcast sites. The demodulated output from the receiver would appear as if it were receiving a signal from only a single site. To elaborate, in a simulcast system, there are two or more identifiable geographical areas commonly referred to as the "capture" and the "non-capture" or "overlap" zones. A capture zone is defined as an area in which the carrier level of one transmitter exceeds the second by approximately 10 dB or more. In this area, the mobile receiver will receive the stronger signal to the complete or nearly complete exclusion of the weaker signal. The capture zone provides the best audio quality in the system.

In the "non-capture" or "overlap" zone, the mobile receive cannot be captured by a single transmitter. Within this zone a mobile receiver accepts two or more carrier signals. The carrier signals mix randomly producing a stronger or weaker signal. If the power level difference between the received carrier signals is less than 6 dB with voice modulation, audio intermodulation and distortion products may be created. Audio distortion increases to a maximum when the carrier signal levels are equal.

The prime concern in the "overlap" zone is to assure that the received carrier signals, at worst, do not detract from one another and at the best, reinforce one another. In addition, the transmitted audio from each carrier signal must be equalized to reduce the distortion produced at the mobile receiver. In general, to achieve these objectives three types of system equalizations are required: RF carrier frequency, transmitter modulation level and transmitter modulation phase.

Each radio channel at all sites is modulated with amplitude, phase and time delay corrected information. To accomplish this time, phase and amplitude stable circuits must be provided between a main control point site and all other simulcast transmit sites by means of a phase stable (radio, microwave or fiber optic) back-bone system. Commercial wire-common-carriers do not provide the stability required for simulcast. Dedicated, user controlled, voice/data grade, synchronous multiplex used in conjunction with radio, microwave or fiber optic back-bone distribution paths most effectively provide needed circuits and stability for simulcast.

Because path lengths to the various simulcast sites vary and audio frequency and phase response of each transmitter is different, independent time, phase, and frequency response equalization of each simulcast path must be provided. Moreover, the equalization must be relative to the path having the longest unequalized time delay (which is usually, but not necessarily, the longest physical path).

An exemplary public service trunking simulcast system of this sort, which also provides digital access capabilities, is disclosed in greater detail in commonly-assigned U.S. Pat. No. 5,172,396 issued Dec. 15, 1992 to Rose, Jr., entitled "Public Service Trunking Simulcast System", and has been successfully in public use for quite some time.

Simulcasting in a multiple-site RF transmission is thus generally known. The following list (which is by no means exhaustive) of prior issued patents describe various aspects of RF transmission simulcasting and related PST issues:

U.S. Pat. No. 5,172,396 to Rose et al.
U.S. Pat. No. 4,696,052 to Breeden;
U.S. Pat. No. 4,696,051 to Breeden;
U.S. Pat. No. 4,570,265 to Thro;
U.S. Pat. No. 4,516,269 to Kurnock;
U.S. Pat. No. 4,475,246 to Batlivala et al;
U.S. Pat. No. 4,317,220 to Martin;
U.S. Pat. No. 4,972,410 to Cohen et al;
U.S. Pat. No. 4,903,321 to Hall et al;
U.S. Pat. No. 4,608,699 to Batlivala et al;
U.S. Pat. No. 4,918,437 to Jasinski et al;
U.S. Pat. No. 4,578,815 to Persinotti;
U.S. Pat. No. 5,003,617 to Epsom et al;
U.S. Pat. No. 4,939,746 to Childress;
U.S. Pat. No. 4,905,302 to Childress et al;
U.S. Pat. No. 4,905,234 to Childress et al;
U.S. Pat. No. 4,093,262 to Dissosway et al;
U.S. Pat. No. 4,926,496 to to Cole et al;
U.S. Pat. No. 4,968,966 to Jasinski et al;
U.S. Pat. No. 3,902,161 to Kiowaski et al;
U.S. Pat. No. 4,835,731 to Nazarenko et al;
U.S. Pat. No. 4,218,654 to Ogawa et al;
U.S. Pat. No. 4,255,814 to Osborn;
U.S. Pat. No. 4,411,007 to Rodman et al;
U.S. Pat. No. 4,414,661 to Karlstrom;
U.S. Pat. No. 4,472,802 to Pin et al;
U.S. Pat. No. 4,597,105 to Freeburg; and
Japanese Patent Disclosure No. 61-107826.

U.S. Pat. No. 5,172,396, issued Dec. 15, 1992 to Rose et al., entitled "Public Service Trunking Simulcast System", discloses a trunked radio simulcast system having control site and remote site architectures that include RF transmission timing synchronization features that are relevant to the presently preferred exemplary embodiment. In addition, U.S. Pat. No. 4,903,321, issued Feb. 20, 1990 to Hall et al., entitled "Radio Trunking Fault Detection System," discloses a trunked radio repeater system having a radio frequency repeater site architecture that includes fault and call testing and failure detection features that are somewhat relevant to the present invention. These patents are both commonly assigned to the assignee of the present invention and are both incorporated by reference herein.

The present invention is directed toward a "narrow band" PST simulcast radio frequency transmission system having high-speed and low-speed digital access capabilities in addition to analog voice that operates in the 900 MHz frequency range, as distinguished from "wide band" systems that operate predominantly in the 800 MHz frequency range. In particular, the present invention is directed toward a method and apparatus for handling low speed data distribution between sites in a narrow band PST simulcast system.

Conceptually, the 900 MHz narrow band simulcast system in accordance with the presently preferred embodiment of the invention, may be envisioned as a hardware addition or overlay to the applicant's 800 MHz PST repeater systems and PST simulcast system (e.g., see the Childress '746, Childress '302 and Rose et al. '396 patents mentioned above). Moreover, an important aspect of the preferred embodiment of the present invention is applicant's method and apparatus for handling low speed data communication between sites in a narrow band simulcast system. In accordance with a preferred embodiment of the present invention, the disclosed method and apparatus allows independent low speed data communication on each channel, provides more precise control of the low speed data synchronization and eliminates the need for any site paths dedicated to low speed data. Site controller computers can be optionally employed but are not required. A simulcast could operate in a "failsoft" configuration (see Rose et al. '396 patent) or have a site controller only at the main site or at each site. If a back-bone transmission system (i.e., the wide-bond stable communications link between the control point and the remote sites, for example a T-1 link ) failure occurs, normally, the remote sites would be shut down. (In the event of such a back-bone system failure, remote sites equipped with site controllers could be operated independently under the ,control of the system manager computer. However, care must be taken to prevent adjacent, overlapping sites from operating on the same frequency. In addition, a site must have at east two frequencies available to operate as a trunked site.)

Conventionally, in applicant's commercially successful wide band (e.g., 800 MHz) simulcast systems the following three distinct types of information signals are distributed from a control point site and controlled with the necessary precision required to provide simultaneous RF broadcasting at multiple displaced transmission sites: analog voice, low speed data and high speed data (which could be encrypted voice). High speed data is communicated to/from remote transmitting sites at 9.6 K baud via a multi-phase modem channel and adjusted for the appropriate RF transmission delay by digital delay circuitry and resynchronization circuitry at each site. Analog voice (clear voice) is communicated to/from remote sites on a separate delay corrected conventional FSK modem voice channel. Similarly, the low speed data, which conventionally is common to all channels, is converted to an audio band signal and handled as another "voice" path to each site.

It would be most efficient, desirable and cost effective if the above described existing "wide band" simulcast technology could be modified and utilized to provide narrow band simulcast capabilities for a PST system. However, narrow band (400 MHz) digital access communications presents certain difficulties in the above type of simulcast system. For example, the 9600 bps high data communications rate must be changed to 4800 bps. Although it is fairly straight-forward to modify existing 800 MHz simulcast system hardware to accommodate the new baud rates, efficient handling of the low speed data becomes a problem. The Channel Drop signal, which in the conventional 800 MHz system is at 4800 Hz and corresponds to the maximum high speed data rate of alternate ones and zeros, becomes a 2400 Hz signal which is audible (i.e., within the voice frequency transmission bandwidth). Low speed sub-audible data is therefore used for a channel drop signal and, thus, becomes unique to each channel. Unfortunately, this prevents using one common low speed data path to each site, and an additional path for each channel is neither practical nor feasible.

The present invention solves this problem by treating the low speed data as if it were a high speed data signal that happens to consist exclusively of long strings of binary "ones" and "zeros," then routing it to each site via the high speed data path dedicated for each channel. Since a channel is never used for transmitting high and low speed data simultaneously, it is possible to use the high speed data path between sites to carry low speed data whenever high speed data is not transmitted. Moreover, the high speed data path provides a greater degree of synchronization precision for the distribution of low speed data than obtainable via the FSK (voice channel) method conventionally used for distribution of the low speed data—primarily due to elimination of FSK modem quantization and the associated voice band filters. However, in the above described broad band simulcast system, the data resynchronization circuitry in the high speed data path at each site is designed to trigger upon detection of a long string of ones. Consequently, this resynchronization circuitry will constantly attempt to realign (delay) the low speed data transitions causing a corruption of the low speed data information content. Therefore, in order to prevent corruption of the low speed data in this manner, the resynchronization circuitry must be held at its previous latency during the distribution of low speed data (e.g., voice portions of the call).

In accordance with a preferred exemplary embodiment of the present invention, specific circuitry is provided to accomplish the switching (rerouting) of the low speed data onto the high speed data path and control of the resynchronization circuitry at both the control point site and the remote transmitting sites. In addition, an A/D (analog/digital) control signal, available at all sites in applicant's conventional simulcast system, is used in controlling timely path switching and "holding" of resynch circuitry.

BRIEF DESCRIPTION OF THE DRAWINGS

These and other features and advantages of the present invention will be better and more completely understood by referring to the following detailed description of presently preferred exemplary embodiments in conjunction with the sheets of drawings, of which.

DETAILED DESCRIPTION OF PRESENTLY PREFERRED EXEMPLARY EMBODIMENTS

Figure 2:
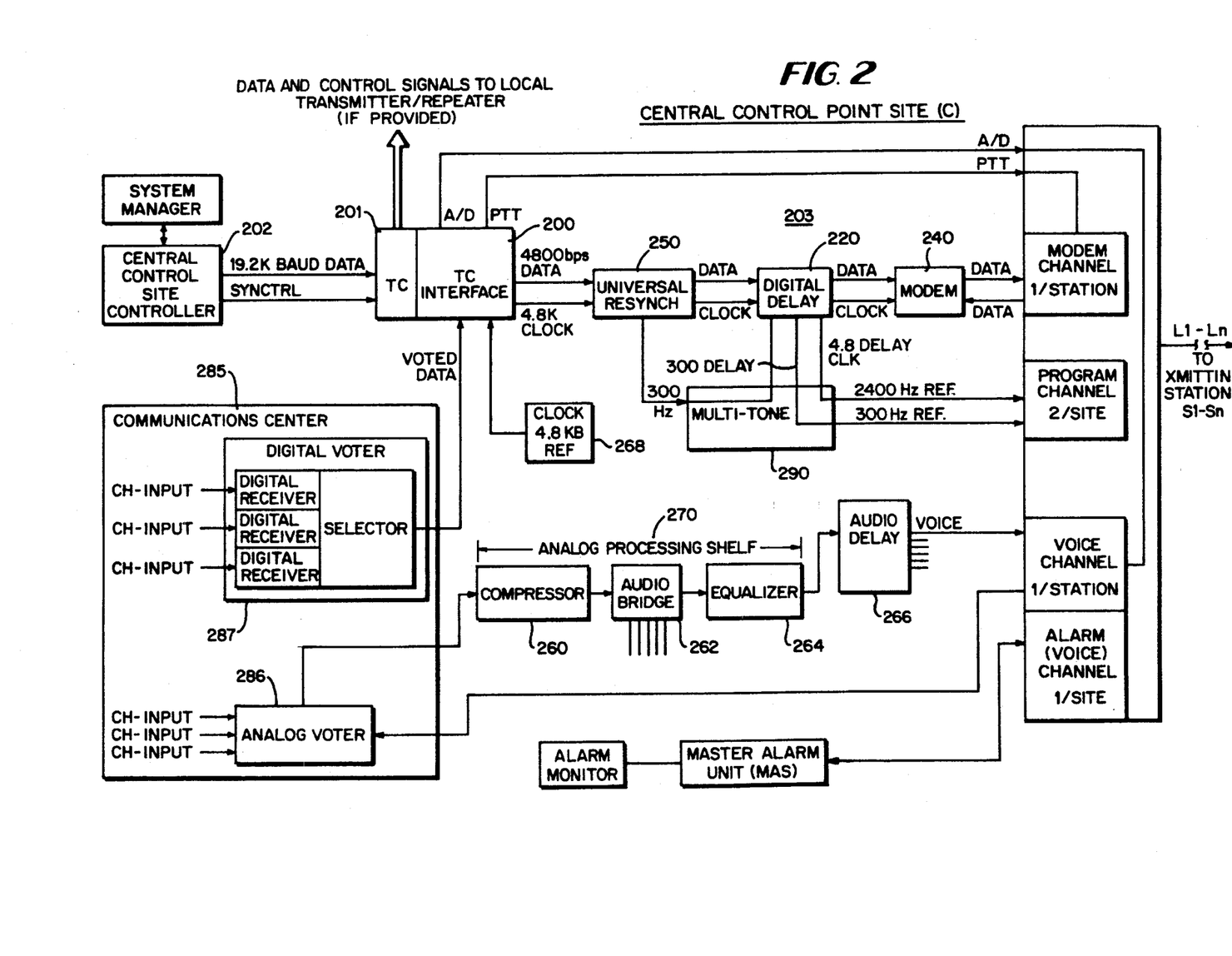
FIG. 2 is a detailed schematic block diagram of the central control point for a 900 MHz narrow band coherent digital data simulcasting RF transmission system in accordance with the presently preferred exemplary embodiment of the present invention.
Figure 3:
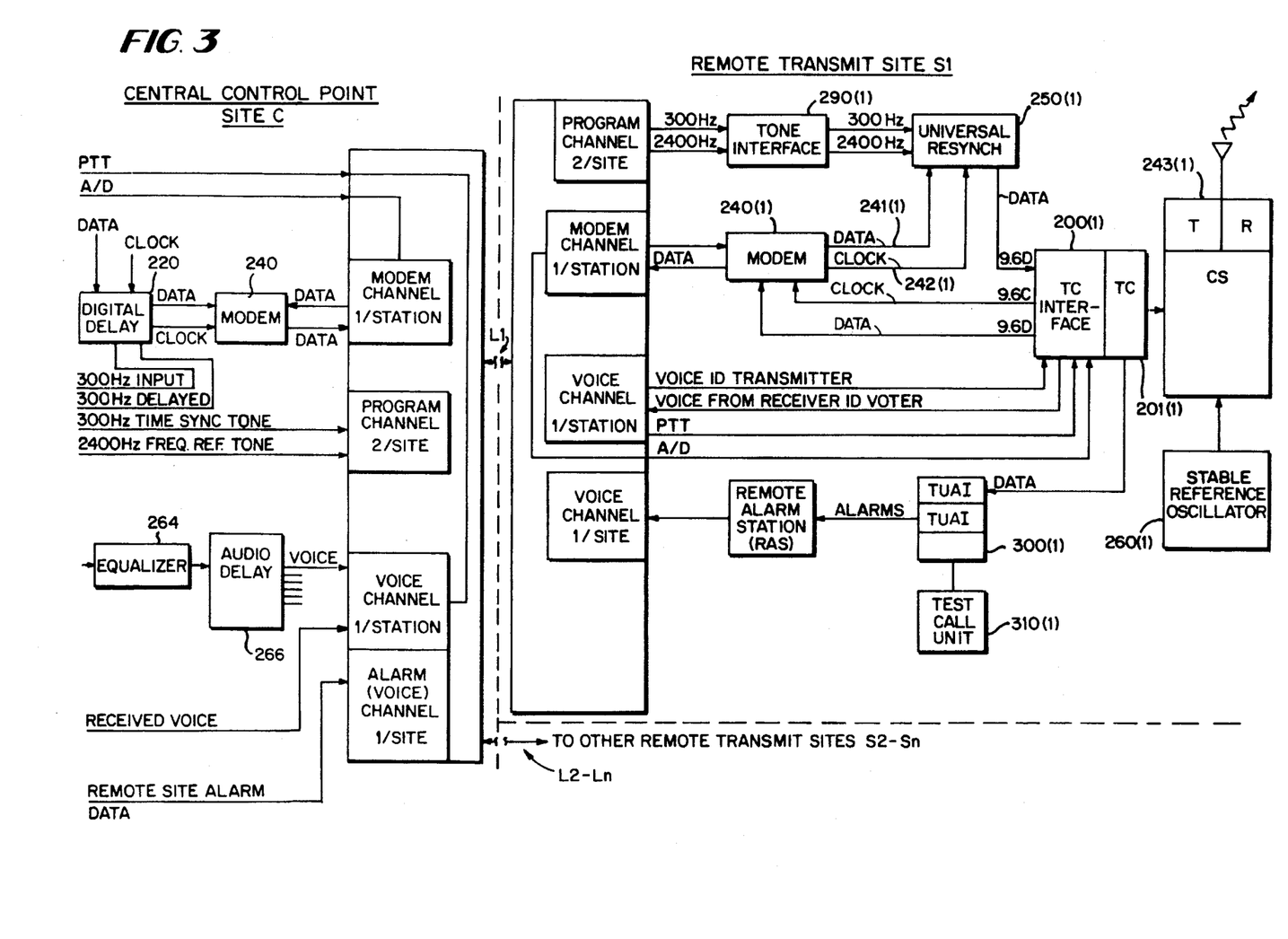
FIG. 3 is a detailed schematic block diagram of an exemplary transmitting site and includes a partial schematic block diagram corresponding to the central control point.

FIG. 2 is a schematic block diagram of a central control point C for the 900 MHz PST "simulcast" digital RF communications system in accordance with an exemplary preferred embodiment of the present invention. The overall architecture of the narrow band PST simulcast system is shown in FIG. 1—that is, it includes a central control point C and plural transmitting sites S1-Sn. Although the (remote) transmitting sites S1-Sn are not shown in FIG. 2 and only a single remote site S1 is shown in FIG. 3, it will be appreciated by one skilled in the art that numerous remote sites participating in simulcasting are likewise in communication with control point C via identical T-1 type microwave or land line communication path links L1-Ln. Moreover, this invention is not limited to use solely with a T-1 microwave or land line link but may be used with any other type of appropriate communication link.

In accordance with a preferred embodiment of the present invention, control point C trunking controller (TC) 200 communicates with a central control point site controller 202 through a 19.2 kB/S RS-232C channel. Based on this communication and on programming, the control point trunking controller is capable of controlling a "local" control point repeater/transmitter station (assuming a repeater station exists at the control point) by sending high speed 4800 baud NRZ data and two control signals, PTT and A/D. In one mode of operation, this channel has the role of being the control channel for the whole system. In another mode, this channel is a working channel where digital "handshake" messages and the transmit audio are delivered. In addition, a source control trunking controller transmits low speed (150 baud) data as a sub-carrier on the working channels to control mobile and portable units switched to these channels.

All of these signals are also passed through a TC interface 201. They are then processed through the main simulcast resynchronization and delay equipment 203 and transmitted through a digital multiplexer (not shown) and/or one or more microwave inks to ("remote") transmitting sites S1-Sn. At a remote transmitting site (e.g., S1), the signals are processed by transmit site simulcast resynchronization equipment and interfaced to the transmitting site trunking control (TC) by another TC interface. This TC at the transmitting site directly controls the transmitting site RF repeater station (i.e., the transmitter receiver equipment).

As mentioned above, remote transmitting (repeater) sites S1-Sn are linked to the control point through corresponding microwave links L1-Ln or equivalent stable delay compensated T1 type communication paths. Each communication "link" may consist of numerous channels for transferring analog or digital data. In accordance with the present invention, an exemplary preferred arrangement of communication paths between control point C to a transmit site are as follows:

One conventional 4-wire E&M channel, per RF channel, for the transmit and receive audio.

One conventional 4-wire E&M channel, per RF channel, for the high speed transmit and receive data, control channel information, high-speed hands:hake, mobile data traffic and low speed data.

One conventional 4-wire E&M channel, per site, for the master/remote alarm system.

Two delay compensated, phase equalized 7.5 kHz program channels, per site, for the 300 Hz and 2400 Hz time and frequency synchronization signals (program channel takes 6 equivalent voice channel slots in a typical T1 channel bank).

Basically, at each site, each simulcast repeater (transmitter) is supported by two multiplex channels. A 4-wire E&M channel sends an equalized and delayed "transmit" audio signal to the transmitter and the "receive" audio signal to an analog signal strength voter. The second 4-wire E&M channel sends appropriately delayed, 4800 bps high speed non-return to zero (NRZ) data (converted by a modem from a 2400 baud analog signal) to the transmitter and the receive data (converted by a modem from 4800 bps NRZ ,data) to the digital voter.

Push-to-talk (PTT) keying and A/D (analog/digital transmit control) signals for the transmitters are/generated by the simulcast control point equipment and distributed to the sites. A keying control panel (not shown) may also be provided at the control point so that individual transmitters may be operated for alignment and test. Simulcast system alarm and control information system (discussed briefly below) also require a 4-wire channel between the control point and each remote repeater site.

Two separate phase equalized delay compensated stable "program" channels are required for carrying the 300 Hz time reference tone and 2400 Hz frequency reference tone to the remote sites.

Referring to FIG. 2, a site controller 202 at control point site C may communicate and coordinate the activity of one or more trunking control processors (although only one trunking conroller is shown in FIG. 2). A control point site (C) basically consists of:

site controller (202)

Trunking control (201) and interface (200)

Simulcast Resynchronization Control, equalization and delay circuits (203)

Analog and digital voting circuits (285)

Master alarm system (MAS)

High and low speed data modem (240)

Trunking control processor (TC) 201 provides data and control signals to modem 240 (e.g., a conventional 4800 baud type multi level, multiphase CCITT telephone type modem) for controlling communication over link L1. Similarly, transmit site S1 (see FIG. 3) is provided with a modem 240(1) for communicating data over link L1. The resulting output data stream provided by each transmitting site modem is applied in the preferred embodiment to a conventional type T-1 time-division-multiplex (TDM) digital telephone network and may be distributed to transmitting other sites S1, S2, . . . Sn via .data grade channels of a conventional microwave link L1.

Referring now to FIG. 3, a schematic block diagram of an exemplary transmitting site including a partial schematic block diagram corresponding to the central control point in accordance with a preferred embodiment of the present invention is depicted. Transmit sites (S1-Sn) basically consist of:

Simulcast trunked repeaters with remote trunking control (200(1))

Simulcast resynchronization unit (250(1))

High and low speed data modem (240(1))

Remote alarm unit (300(1))

As illustrated in FIG. 3, an exemplary remote transit site S1 includes a conventional 4800 baud data modem 240(1) connected to a data channel of L1. Modem 240(1) decodes the multiphase, multilevel 4800 baud data stream sent to it by a control point modem 540 via link L1. Data modem 240(1) at transmit site S1 also has an external clock signal input (not shown) that is connected to an external 9.6 KHz system clock provided for this channel (as described in the above-referenced Brown et al, patent application Ser. No. 07/824,123 ). Data modem 240(1) provides a decoded 4800 baud data stream 241(1) at its data output and also provides recovered 4800 Hz clocking information 242(1) derived from and corresponding to a received data stream.

The data stream provided at the output of transmitting site S1 modem 240(1) corresponds to the data stream applied to the input of control point C modem 240, and the timing of this output stream is controlled (under normal conditions) by two distributed system clock frequency reference and timing signals. This data output is applied to site S1 station transceiver 243(1) for transmission over a radio frequency carrier. The timing of the RF transmission at the remote site is thus determined by the timing of the data output of modem 240(1) as conditioned by transmitting site S1 resynch circuit 250(1).

In addition, each simulcast repeater site S1-Sn is equipped with a frequency synthesizer 260(1), providing a spectrally pure stable exciter input frequency reference that is phase locked to a WWVB receiver/oscillator. A WWVB receiver (not shown) receives and locks onto the 60 kHz reference signal transmitted by the National Institute of Science and Technology (NIST) in Fort Collins, Colo. However, other standards such as an atomic clock with a rubidium source or the Global Positioning Satellite could also conceivably be used.

Transmit site S1 is also provided with a test alarm and test unit interface unit (TUAI) 300(1). Testing and alarm unit 300(1) monitors tests initiated by test call unit 310(1) and provides status information on the condition and operability of all channels at remote site S1. This alarm/status subsystem is an overlay of applicant's prior simulcast system alarm/status subsystem (see Rose et al. patent discussed above) to the presently described 900 MHz simulcast system. It basically consists of a master alarm station (MAS) at the central control point and remote alarm stations at each of the remote transmitting/repeater sites (RAS).

The Universal Resynch units 250–250(n) provide the synchronization of the data at the control and the transmit sites. In the exemplary preferred embodiment, each universal resynch unit is capable of synchronizing data for at least four (4) channels. Circuitry used to buffer the 4800 baud data from four channels, comprises a first-in-first-out (FIFO) buffer per channel.

A universal resynch circuit may be configured for control point to remote transmit site operation, and for "master" or "slave" operations. The control point operation allows the use of a master clock located at control point C and also supplies the resynch data/clocks and tones to the remote transmit sites S1-Sn. A "master" configuration allows a single universal resynch circuit at a particular site location (control or remote) to generate the clocks for other optional slaved universal resynch circuits (not shown).

At central control point C, universal resynch 250 generates a master 4.8 kHz clock 268 derived from a stable clock source. The (master) universal resynch (250) also generates a 300 Hz resynch clock (square-wave pattern) to be sent along with the 4.8 kHz clock to other (slave) universal resynch boards at the control point. Synchronization of the control point TC 4800 baud data is made with reference to the 4.8 kHz master clock and shifted out through a FIFO in universal resynch 250. The 300 Hz tone provides the time synchronization for the data. (However, the 300 Hz tone is interrupted when a control channel is changed.) The zero crossings of the 300 Hz tone are used for the timing of the data release from the FITOs. in addition, a 2.4 kHz tone, derived at the multi-tone interface board is also used for frequency synchronization of all clocks throughout the simulcast system.

At remote transmit site S1 (FIG. 3), a master universal resynch board regenerates a master 4.8 kHz from the received 2.4 kHz resynch tone (from the control point) using a Phase-Locked-Loop (PLL). The 300 Hz clock is sent with the 4.8 kHz clock to the other (slave) universal resynch boards at transmit sites S1. Synchronization of the transmit site S1 TC 4800 baud data is made with reference to the 4.8 kHz master clock and shifted out through a FIFO in universal resynch 250(1).

For simulcast timing (delay) equalization, several stages are utilized for each of the three conventional types of signals in the trunking environment (i.e., high speed data, analog voice and low speed data). For high speed data signals, the absolute delay required for simulcasting is provided by the use of a shift register data delay circuit 220. Upon the detection of a unique data pattern, the delay references at all of the transmit repeater sites are reset by a universal resynchronization circuit to a known state. This "timing mark" ensures that the first bid of a data message is transmitted simultaneously from all sites so that the relative time delay of high speed data signals from different transmitters on the same channel will be maintained within on microsecond.

For analog voice signals, the signal is first processed through an analog signal processing stage (shelf) including a compressor (260), and an amplitude/phase equalizer 264. The absolute delay is then provided by a digitally controlled analog delay unit 266. Accordingly, the relative phase between audio signals from different transmitters on the same channel is maintained within 25 degrees maximum in the audio frequency range of 600 to 2600 Hz.

In an exemplary preferred embodiment, modems 240–240(n) interface to a multiplexer (not shown) in order to receive and transmit the multi-amplitude multi-phase 4800 baud data. A modem receives the data and clocking information for transmitting from a data delay unit (e.g., digital delay 220) if it is located at control site C or from a TC interface module if located at one of the transmit sites S1-Sn. The 4800 baud transmit site modems are enabled for transmission through an active Request-to-send (RTS) signal provided by the transmit site TCs.

In the preferred embodiment, a modem assembly utilizes CCITT signaling to convert the data and clock information into a multi-amplitude-multi-phase analog signal. At power-up, all modems are configured for a "default" mode of operation which includes external data clock operation (e.g., see the Brown et al patent application discussed above).

Digital delay circuit 220 provides time delay of all data and clocks to the transmit sites. This is to ensure equal time of arrival for the digital data signals in the simulcast "overlap" region. In the presently preferred embodiment, the data is running at 4800 bps and the clock is operating at 4.8 kHz. The digital delay unit (220) is used at control point C only. The individual transmit sites S1-Sn receive the delayed data and reference time clocks from control point C. In the presently preferred embodiment, a digital delay unit is capable of providing time delay on two (2) sets of twelve (12) data/clock channels. One set of ten (10) data channels and two (2) clock signals (4.8 kHz and 300 Hz) are; delayed for one transmit site, while the second set of signals is delayed for a second transmit site. The data clocks are to be delayed for a second transmit site. The data clocks to be delayed are derived from associated universal resynch circuits and multi-tone circuit 290. For each set, the twelve (12) digital inputs are delayed by the same time offset. In the presently preferred embodiment, digital delay is performed through a RS-232C to TTL conversion of the data and clock, subsequent time delay of the digital data and clock through a RAM based FIFO buffer and followed by the TTL to RS-232C conversion of the data and the clock.

An analog delay circuit provides the time delay for all analog/voice to the transmit sites. This is to ensure equal time of arrival of the audio signals in the simulcast "overlap" region. Analog delay units 266 are used at the control point only. The individual transmit sites S1-Sn then receive the delayed audio from the control point.

In the presently preferred embodiment, an analog delay unit performs the time delay of audio signals for one particular transmit for up to thirteen (13) signals. The audio to be delayed is derived from the voice output of audio equalizer processing shelf subsystem 270. Thirteen (13) audio inputs are delayed by the same offset (time) and sent through the multiplexer (and the microwave link) to a transmit site S1-Sn. The analog delay is accomplished through an analog to digital conversion of the audio signal, a subsequent time delay of the digital data stream through a RAM based FIFO buffer and followed by a digital to analog conversion of the signal.

Multi-tone interface circuit 290 conditions the 300 Hz and the 2400 Hz resynch reference tones, which are used for frequency synchronization of all the clocks throughout the simulcast system. A 300 Hz (square-wave) clock, generated by universal resynch circuit 250 at the control point, is fed to the multi-tone interface circuit, where it is split into four (4) identical 300 Hz (squarewave) outputs. The four signals are time delayed by the digital delay circuit and are filtered to obtain band limited reference tone signals. The 300 Hz tones are then transformed from unbalanced to balanced signals through a Balun transformer. Each of the four (4) 300 Hz and 2400 Hz tones pairs is then connected to a multiplexer program channel for distribution to remote sites S1-Sn.

Three different types of audio units are installed in analog processing shelf 270: compressor 260, audio bridge 262 and equalizer 264. Each analog shelf may include up to two (2) sets of one (1) compressor, one (1) bridge and up to four (4) equalizers. The shelf can also be configured for one (1) compressor, one (1) bridge and up to 10 equalizers with each set of units for one voice channel. For audio compression, in an exemplary preferred embodiment of the present invention a Tellabs Model 4006 Compression Amplifier is used. The 4006 compression amplifier combines continuously adjustable linear gain with linear level limiting, adjustable over a wide range or output levels, resulting in a low-distortion compressed voice frequency signal. An active audio bridge 262 serves as a signal splitter to provide a separate buffered audio source for each Site on a given channel. Its gain is chosen so that the per site equalizer which follows operates well within the level adjustment range. In a preferred embodiment of the present invention, a Tellabs Model 4041 Amplitude/Delay Equalizer 262 is used for equalizing both amplitude and time delay conditioning for the voice frequency channel. In addition, amplitude equalization circuitry 264 can be switched-optioned for flat response, high-end and low-end, bump-type equalization, or slope-type equalization. Since simulcast extends the "talk-out" range of a digital access PST system, it is also necessary to similarly extend the "talk-in" range. Therefore, satellite receiver voting is normally an integral part of a simulcast system. Simulcast and receiver voting are essentially independent functions that may share common facilities. Details of an exemplary preferred receiver voting system are discussed in commonly assigned U.S. Pat. No. 5,131,010 to Derrenge et al., incorporated herein by reference.

In a preferred embodiment of the present invention, the narrow band 900 MHz digital access simulcast system also utilizes voting to receive clear voice (i.e., analog voice) transmissions from the user equipment. Each simulcast channel requires a voter communication center 285 which can handle both analog (voice) and the digital information. Voter circuits, e.g., analog voter 286 and digital voter 287, both operate in parallel, processing both voice and associated digital control information.

The digital voter portion 287 is comprised of digital receivers and a selector. The digital receiver serves different functions depending on the type of call in progress. Messages associated with clear voice (e.g., channel requests), and special call signalling containing error detection bits which make it possible to determine if a message is error free. Therefore, the selector need not decide which receiver has the best message. Rather, it operates on a first-come-first-served basis. Once the digital portion of the call has been sent to the site controller through the Control TC, any duplicate messages received during a period of time after that will be discarded. At this point, the voting responsibility is turned over to the analog part of the voter for the clear voice portion of the call.

The analog voter portion 286 is comprised of the receiver line module and one voting selector. The receiver line module determines the signal-to-noise ration (SNR) of the analog signal and the voting selector chooses the signal with the highest SNR. This voted signal is sent to the multisite controller or console electronics controller and to the simulcast sub-system.

Tone interface module (290(1) is used only at the transmit site. Its function is to condition the 300 Hz and 2400 Hz signals for use by the simulcast synchronization equipment. These band limited signals are "squared up" :for timing and frequency reference applications. The operative functional components of tone interface module include basically a zero crossing detector with a Schmitt Trigger to provide hysteresis.

Figure 4:
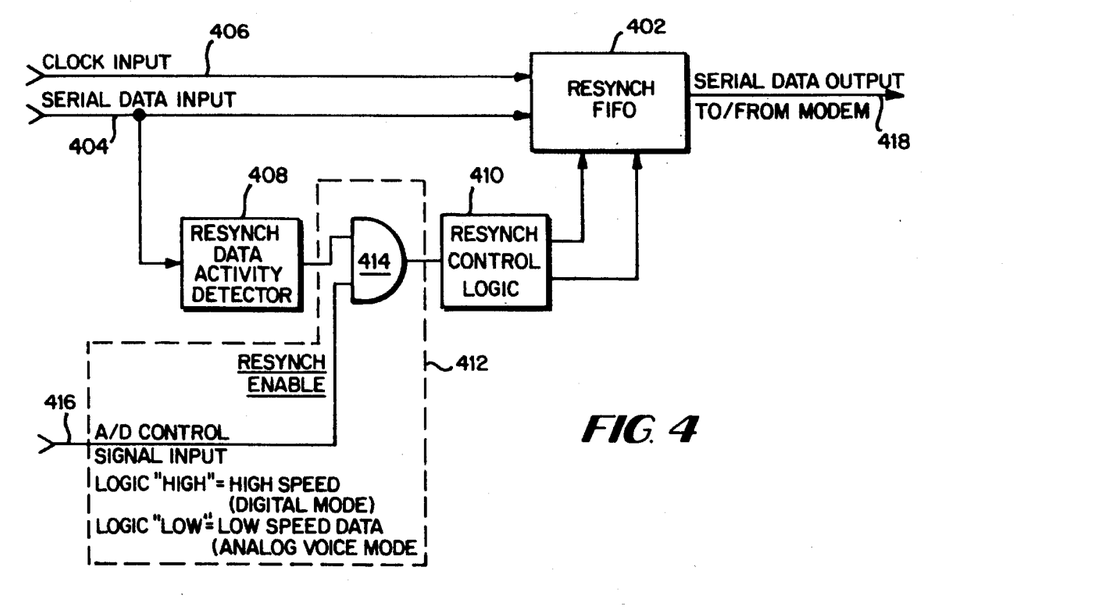
FIG. 4 is a schematic block diagram of an exemplary circuit arrangement of a modified conventional broad band simulcast system universal resynchronization circuit for maintaining the resynchronization timing at its previous latency during the transmission of low speed data.

Referring now to FIG. 4, a schematic block diagram of portions of a resynchronization (resynch) circuit of a conventional broad band PST simulcast system is shown including a specific hardware modification for controlling the operation of the circuit in response to the A/D signal distributed to each site. (Conventional resynchronization circuits of this type contemplated are described in detail in commonly assigned U.S. Pat. No. 4,172,396 to Rose et al, which is incorporated herein by reference.) Only slight modifications to .other portions (not shown) of this conventional resynchronization circuit are necessary to provide the separate 300 Hz resynchronization timing and 2400 Hz frequency reference signals. Specifically, the counter modulus for the conventional resynchronization circuit must be changed by a factor of 2 to accommodate the new baud rate and the change from the 4800 Hz reference as used ill the conventional arrangement to the 2400 Hz reference standard of present embodiment.

Resynch circuit FIFO 402 provides synchronized serial data output 418 to/from a site modem in response to control signals from resynch control logic 410 which is triggered by data activity detector 408 upon detection of activity on serial data input line 404. In accordance with an exemplary preferred embodiment of the present invention, resynch enable (hold) circuit 412 is added to the conventional resynchronization circuit arrangement to suspend operations during transmissions of low speed data. Resynch enable circuit input line 416 is connected to the A/D mode signal provided at all sites by the control point. Digital logic element 414 gates the output from data activity detector 408 to the resynch control logic 410 only in response to an A/D signal condition on line 416 indicative of a digital mode transmission. (For example, a logic "high" condition of the A/D signal indicates transmission of high speed data/digital mode; logic "low" condition indicates low speed/analog mode). This assures that the resynchronization circuitry will be held at its previous latency during the low speed data (voice) portion of a simulcast transmission.

Figure 5A:
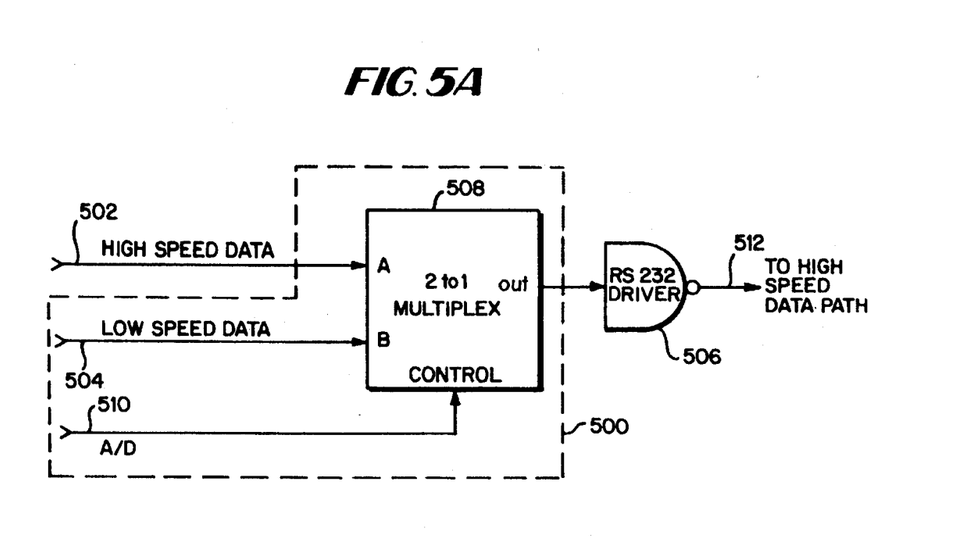
FIGS. 5A and 5B are schematic diagrams of exemplary modified circuit arrangements within the trunking controller interface of a conventional broad band simulcast system for routing low speed data onto the high speed data channel path at the control site and for routing low speed data from the high speed data channel path at a transmitting site, respectively.
Figure 5B:
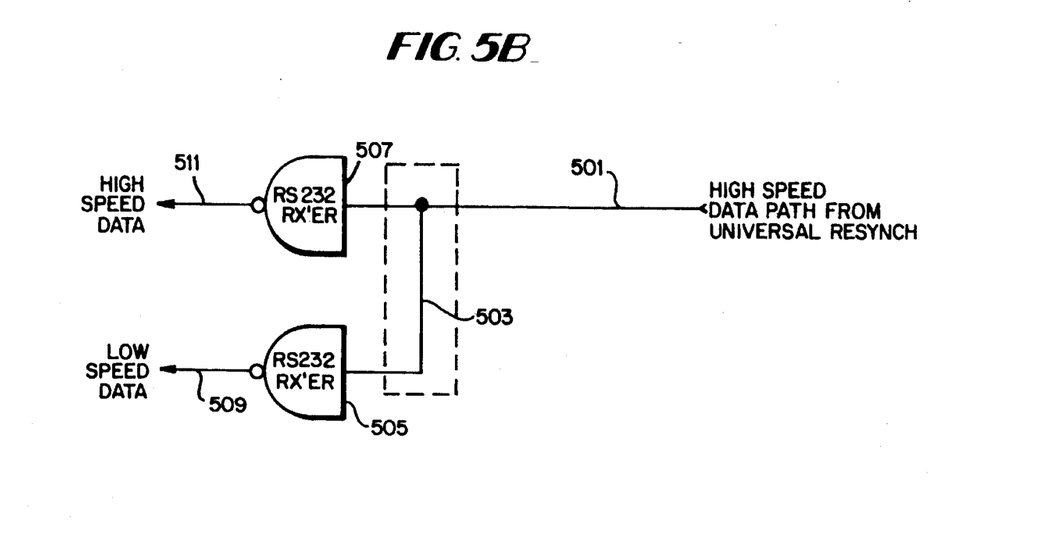

Referring now to FIGS. 5A and 5B, schematic diagrams depict exemplary hardware modifications made within the trunking controller interface of a conventional broad band PST simulcast system for controlling the routing of low speed data onto the high speed data channel path at the central control site and and from the high speed data channel path at a transmitting site, respectively. (A conventional trunking controller of this type is described in detail in one or more of the commonly assigned U.S. Patents to Rose et al or Childress et al mentioned above and which are incorporated herein by reference.)

In accordance with an exemplary preferred embodiment of the present invention, high speed/low speed data routing control circuit 500 is added to the control end (interface) of the conventional trunking control (TC) located at the control site (c) to provide controlled switching between high speed and low speed data sources. Routing control circuit high speed data input line 502 is connected to a control end output source of high speed data within the trunking controller. Similarly, routing circuit low speed data input lines 502 and 504 are provided to a conventional 2 to 1 multiplexer 508 that exclusively passes either the signal from input line 502 or the signal from input line 504 to a conventional RS232 line driver (506) depending on the logic state of the signal on multiplexor control line 510. The A/D control signal generated by control point trunking controller 200 is provided to the data routing control circuit 500 and used to select which input data signal is to be provided onto the high speed data path via driver 506 output line 512. (For example, an A/D logic "high" condition selects the high speed data from input line 502 and a logic "low" condition selects low speed data from input line 504.) Driver output line 512 is consequently used as the high speed data patch to the trunking control (TC) universal resynchronization circuit at the control point site.

FIG. 5B depicts outputs of conventional RS232 line drivers 505 and 507 connected to the high and low speed data paths 509 and 511 within a transmitting site trunking controller interface. Data path routing at a transmitting site is accomplished by a permanent parallel connection of the inputs of drivers 505 and 507 via line 503 to the high speed data path 501 from the transmitting site universal resynchronization circuit. Utilization of data from the appropriate high or low speed data paths 509 and 511 within the transmitting gate trunking controller is managed in accordance with the A/D control signal provided to all sites from control point C.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. In a radio frequency communications system having plural spatially separated RF transmitters all transmitting substantially the same signal at substantially the same radio frequency, said system distributing a common clocking signal to each of said plural transmitters so as to facilitate a substantially simultaneous signal transmission by said plural transmitters and also distributing message data and control signal data to each of said transmitters over a high-speed data channel from a central control point, said central control point including:

switching circuitry which controls routing of either high speed or low speed data transmitted over a single high speed data channel from said central control point to each of said RF transmitters in response to said control signal data; and, each of said plural RF transmitters including:

a first circuit arrangement which determines, at least in part, timing of high-speed digital data signal transmissions received from said central point over a high speed data channel;

a second circuit arrangement operatively coupled to said first circuit arrangement, which suspends operation of said first circuit in response to said control signal indicating the transmission of low speed-data; and a third circuit arrangement which provides both high-speed and low-speed data to RF power transmitting circuitry.

2. In a narrow band type public service trunked simulcast radio frequency transmission system having plural transmitter sites, at least one high-speed data channel from a central control point to each transmitter site for carrying message data and control signal data to said transmitter sites, and having high-speed data signal synchronization circuitry associated with said high-speed data channel at each site, a method for providing both high-speed and low-speed digital data over a single high speed data channel to each site, comprising the steps of:

providing low-speed digital data over said high-speed data channel for each site; and in response to said control signal data, holding the high-speed data synchronization circuitry at each site in an inoperative suspended state during the transmission of low-speed data over said high-speed data channel, thus preventing a triggering of the synchronization circuitry upon reception of low-speed data over said high-speed data channel, so as to maintain a latency condition provided by said circuitry prior to reception of said low-speed data.

* * * * *